(12) United States Patent
Bou Daher et al.

(10) Patent No.: US 10,863,269 B2
(45) Date of Patent: Dec. 8, 2020

(54) SPATIAL DOUBLE-TALK DETECTOR

(71) Applicant: BOSE CORPORATION, Framingham, MA (US)

(72) Inventors: Elie Bou Daher, Marlborough, MA (US); Cristian M. Hera, Lancaster, MA (US); Vigneish Kathavarayan, Marlborough, MA (US); Tobe Z. Barksdale, Bolton, MA (US)

(73) Assignee: BOSE CORPORATION, Framingham, MA (US)

( * ) Notice: Subject to any disclaimer, the term of this patent is extended or adjusted under 35 U.S.C. 154(b) by 253 days.

(21) Appl. No.: 16/149,658

(22) Filed: Oct. 2, 2018

(65) Prior Publication Data

US 2019/0104360 A1 Apr. 4, 2019

Related U.S. Application Data

(60) Provisional application No. 62/567,474, filed on Oct. 3, 2017.

(51) Int. Cl.
*H04R 3/00* (2006.01)
*H04R 1/40* (2006.01)
*G10L 25/78* (2013.01)
*G10L 25/21* (2013.01)
*H04M 9/08* (2006.01)

(52) U.S. Cl.
CPC .............. *H04R 3/005* (2013.01); *G10L 25/21* (2013.01); *G10L 25/78* (2013.01); *H04M 9/082* (2013.01); *H04R 1/406* (2013.01); *H04R 2201/401* (2013.01)

(58) Field of Classification Search
CPC ...................................................... H04R 3/00
See application file for complete search history.

(56) References Cited

U.S. PATENT DOCUMENTS

| 5,146,470 A | 9/1992 | Fujii et al. |
| 5,371,789 A | 12/1994 | Hirano |
| 5,400,394 A | 3/1995 | Raman et al. |
| 5,641,927 A | 6/1997 | Pawate et al. |

(Continued)

FOREIGN PATENT DOCUMENTS

| EP | 2984763 A1 | 2/2016 |
| JP | 2011166484 A | 8/2011 |
| WO | 2014168618 A1 | 10/2014 |

OTHER PUBLICATIONS

International Search Report and Written Opinion from International Application No. PCT/US2018/044765 dated Sep. 26, 2018.

(Continued)

*Primary Examiner* — Olisa Anwah
(74) *Attorney, Agent, or Firm* — Lando & Anastasi, LLP

(57) ABSTRACT

Double-talk detection systems and methods are provided that include a plurality of microphones and array processing to detect when a vehicle occupant is speaking. One or more array processors combine the microphone signals to provide a primary signal and a reference signal. The responses of the primary signal and the reference signal are different in the direction of an occupant location. A comparison of energy content is made between the primary signal and reference signal to selectively indicate double-talk based on the comparison.

27 Claims, 9 Drawing Sheets

(56) References Cited

U.S. PATENT DOCUMENTS

| | | |
|---|---|---|
| 5,671,287 A | 9/1997 | Gerzon |
| 5,960,077 A | 9/1999 | Ishii et al. |
| 6,041,290 A | 3/2000 | Matt et al. |
| 6,185,300 B1 | 2/2001 | Romesburg |
| 6,438,225 B1 | 8/2002 | Tahernezhaadi |
| 6,539,091 B1 | 3/2003 | Schertler |
| 6,570,985 B1 | 5/2003 | Romesburg |
| 6,574,337 B1 | 6/2003 | Kawada |
| 6,658,107 B1 | 12/2003 | Sorqvist et al. |
| 6,799,062 B1 | 9/2004 | Piket et al. |
| 6,842,516 B1 | 1/2005 | Armbruster |
| 7,050,575 B1 | 5/2006 | Romesburg |
| 7,062,041 B2 | 6/2006 | Buchner et al. |
| 7,310,425 B1 | 12/2007 | Benesty et al. |
| 7,359,504 B1 | 4/2008 | Reuss et al. |
| 7,672,445 B1 | 3/2010 | Zhang et al. |
| 7,680,265 B2 | 3/2010 | Piket et al. |
| 8,233,632 B1 | 7/2012 | MacDonald et al. |
| 8,295,493 B2 | 10/2012 | Faller |
| 8,947,992 B2 | 2/2015 | Little et al. |
| 9,071,900 B2 | 6/2015 | Vesa et al. |
| 9,832,569 B1 | 11/2017 | Ayrapetian et al. |
| 9,854,378 B2 | 12/2017 | Sun et al. |
| 10,200,540 B1 | 2/2019 | Hera et al. |
| 10,367,948 B2 | 7/2019 | Wells-Rutherford et al. |
| 10,542,153 B2 | 1/2020 | Hera et al. |
| 10,594,869 B2 | 3/2020 | Hera et al. |
| 2001/0024499 A1 | 9/2001 | Hasegawa |
| 2004/0264686 A1 | 12/2004 | Enzner |
| 2005/0063536 A1 | 3/2005 | Myllyla et al. |
| 2005/0129226 A1 | 6/2005 | Piket et al. |
| 2005/0175129 A1 | 8/2005 | Roovers et al. |
| 2005/0213747 A1 | 9/2005 | Popovich et al. |
| 2007/0019803 A1 | 1/2007 | Merks et al. |
| 2007/0076891 A1 | 4/2007 | Cho |
| 2007/0258514 A1 | 11/2007 | Wajcer et al. |
| 2008/0031467 A1 | 2/2008 | Haulick et al. |
| 2008/0101622 A1 | 5/2008 | Sugiyama |
| 2008/0112569 A1 | 5/2008 | Asada |
| 2008/0219463 A1 | 9/2008 | Liu et al. |
| 2008/0273714 A1 | 11/2008 | Hartung |
| 2009/0055170 A1* | 2/2009 | Nagahama ............... G10L 15/20 704/226 |
| 2009/0074177 A1 | 3/2009 | Takada |
| 2009/0147975 A1 | 6/2009 | Horbach et al. |
| 2009/0232297 A1 | 9/2009 | Takada |
| 2009/0304198 A1 | 12/2009 | Herre et al. |
| 2010/0046762 A1 | 2/2010 | Henn et al. |
| 2010/0074432 A1* | 3/2010 | Adeney ................. H04M 9/082 379/406.08 |
| 2010/0074433 A1 | 3/2010 | Zhang et al. |
| 2010/0150376 A1 | 6/2010 | Itou |
| 2010/0215184 A1 | 8/2010 | Buck et al. |
| 2010/0303228 A1 | 12/2010 | Zeng et al. |
| 2011/0019831 A1 | 1/2011 | Liu |
| 2011/0058667 A1 | 3/2011 | Takada |
| 2011/0081024 A1 | 4/2011 | Soulodre |
| 2011/0135105 A1 | 6/2011 | Yano |
| 2011/0178798 A1 | 7/2011 | Flaks et al. |
| 2012/0027216 A1 | 2/2012 | Tirry et al. |
| 2012/0040757 A1 | 2/2012 | Page |
| 2012/0076308 A1 | 3/2012 | Kuech et al. |
| 2012/0093348 A1 | 4/2012 | Li |
| 2012/0140940 A1 | 6/2012 | Hwang et al. |
| 2012/0330652 A1 | 12/2012 | Turnbull et al. |
| 2013/0022206 A1* | 1/2013 | Thiergart ............... G10L 19/025 381/17 |
| 2013/0251169 A1 | 9/2013 | Awano et al. |
| 2013/0268267 A1 | 10/2013 | Hwang et al. |
| 2013/0301840 A1 | 11/2013 | Yemdji et al. |
| 2013/0304480 A1 | 11/2013 | Kuntz et al. |
| 2013/0315408 A1 | 11/2013 | Yano et al. |
| 2014/0112496 A1 | 4/2014 | Murgia et al. |
| 2014/0270148 A1 | 9/2014 | Cleve |
| 2014/0286497 A1 | 9/2014 | Thyssen et al. |
| 2014/0334620 A1 | 11/2014 | Yemdji et al. |
| 2014/0335917 A1* | 11/2014 | Tetelbaum ............ H04M 9/082 455/570 |
| 2014/0357324 A1 | 12/2014 | Ahgren |
| 2015/0112672 A1 | 4/2015 | Giacobello et al. |
| 2015/0197195 A1 | 7/2015 | Hera et al. |
| 2015/0215722 A1 | 7/2015 | Milne et al. |
| 2015/0371658 A1* | 12/2015 | Gao ..................... G10K 11/178 381/66 |
| 2016/0019909 A1 | 1/2016 | Shi et al. |
| 2016/0127535 A1* | 5/2016 | Theverapperuma ........................ G10L 21/0205 455/570 |
| 2016/0182770 A1 | 6/2016 | Ushakov |
| 2016/0232920 A1* | 8/2016 | Matheja ................. G10L 25/78 |
| 2016/0261951 A1* | 9/2016 | Matheja ................. H03G 3/301 |
| 2016/0309119 A1 | 10/2016 | Lasser |
| 2017/0006373 A1 | 1/2017 | Bruss |
| 2017/0047072 A1 | 2/2017 | Eriksson |
| 2017/0214800 A1* | 7/2017 | Nagai ..................... G10L 25/48 |
| 2018/0027125 A1 | 1/2018 | Petri et al. |
| 2018/0040333 A1 | 2/2018 | Wung et al. |
| 2018/0343345 A1 | 11/2018 | Awano et al. |
| 2018/0367674 A1 | 12/2018 | Schalk-Schupp et al. |
| 2019/0045065 A1 | 2/2019 | Hera et al. |
| 2019/0045066 A1 | 2/2019 | Hera et al. |
| 2019/0104360 A1 | 4/2019 | Bou Daher et al. |

OTHER PUBLICATIONS

International Search Report and Written Opinion from International Application No. PCT/US2018/053985 dated Jan. 2, 2019.

Beaugeant et al., "New optimal filtering approaches for hands-free telecommunication terminals", Signal Processing (1998), pp. 33-47.

Bendat et al., "Random Data Analysis and Measurement Procedures", Wiley (2010), Chapter 7, section 7.1, pp. 201-206.

Doclo et al., "Combined acoustic echo and noise reduction using GSVD-based optimal filtering", 2000 IEEE International Conference on Acoustics, Speech, and Signal Processing. Proceedings (Cat. No. 00CH37100), vol. 2, pp. II1061-II1064. doi: 10.1109/ICASSP.2000.859146. Retrieved from <https://pdfs.semanticscholar.org/1784/8d74d90491759e9eb4b0822201eb3bd9da07.pdf>.

Emura et al. "A Method for Posterior Frequency-Domain Multi-Channel Residual Echo Canceling", IEEE International Conference on Acoustics, Speech and Signal Processing (2011), pp. 421-424.

Emura, S. "Residual Echo Reduction for Multichannel Acoustic Echo Cancelers With a Complex-Valued Residual Echo Estimate", IEEE/ACM Transactions on Audio, Speech, and Language Processing (2018) vol. 26, No. 3, pp. 485-500.

Hansler et al., "Acoustic Echo and Noise Control: A Practical Approach", Wiley & Sons (2004), Chapter 10, section 10.2, pp. 244-247.

Le Bouquin Jeannès et al., "Combined Noise and Echo Reduction in Hands-Free Systems: A Survey", IEEE Transactions on Speech and Audio Processing (Nov. 2001), vol. 9, pp. 808-820.

Ochiai et al., "Echo Canceller with Two Echo Path Models", IEEE Transaction on Communications (1977), pp. 589-595.

International Search Report and Written Opinion from International Application No. PCT/US2018/044760 dated Oct. 18, 2018.

International Search Report and Written Opinion from International Application No. PCT/US2018/044762 dated Oct. 30, 2018.

\* cited by examiner

SPATIAL DOUBLE-TALK DETECTOR

CROSS REFERENCE TO RELATED APPLICATIONS

This application claims priority under 35 U.S.C. § 119(e) to U.S. Provisional Application Ser. No. 62/567,474 titled SPATIAL DOUBLE-TALK DETECTOR filed on Oct. 3, 2017, and is related to U.S. patent application Ser. No. 15/667,988 titled EFFICIENT REUTILIZATION OF ACOUSTIC ECHO CANCELER CHANNELS filed on Aug. 3, 2017, and to U.S. patent application Ser. No. 15/668,073 titled MULTI-CHANNEL RESIDUAL ECHO SUPPRESSION filed on Aug. 3, 2017, and to U.S. patent application Ser. No. 15/668,237 titled MITIGATING IMPACT OF DOUBLE TALK FOR RESIDUAL ECHO SUPPRESSORS filed on Aug. 3, 2017, each of which is incorporated herein by reference in its entirety for all purposes.

TECHNICAL FIELD

Aspects and examples of the present disclosure are directed generally to voice and audio systems and methods, and in some examples, more specifically to systems and methods for detecting double talk, which may be useful in systems that remove or reduce acoustic echo and/or noise signals from microphone signals.

BACKGROUND

Audio systems, especially automobile audio systems, are used to produce acoustic signals for various purposes such as entertainment (e.g., music, talk radio, sports), navigation (e.g., route guidance), and communication (e.g., telephone calls). Some audio systems include one or more microphones intended to pick up a user's voice for certain applications, such as the near end of a telephone call or for commands to a virtual personal assistant. The acoustic signals produced by the audio system also contribute to the microphone signals, and may undesirably interfere with processing the user's voice signal. Some systems implement echo and/or noise reduction and may include spectral processing/post-filtering, each of which may include adaptive components. A robust double-talk detector may be advantageous to detect when a local user speaks, which may be used as an indicator to pause adaptive components.

SUMMARY

Aspects and examples are directed to audio systems and methods that detect local speech activity for double-talk detection in noise and echo reduction systems.

According to one aspect, a double-talk detector is provided that includes a plurality of microphones configured to provide a plurality of signals, a first array processor configured to combine the plurality of signals to provide a first array signal having a first response in a direction of a user location, the first array signal having a first energy level when an occupant at the user location is not speaking, a second array processor configured to combine the plurality of signals to provide a second array signal having a second response in the direction of the user location, the second response being different from the first response, and the second array signal having a second energy level when the occupant is not speaking, the second energy level being a substantially fixed ratio to the first energy level when the occupant is not speaking and having a higher ratio when the occupant is speaking, and a processor configured to make a comparison of an energy content of the first array signal to an energy content of the second array signal and to selectively indicate double-talk based on the comparison.

In some examples, the plurality of microphones are arranged in a non-linear physical arrangement. In certain examples, the plurality of microphones includes four microphones mounted in a vehicle and each of the four microphones are arranged physically at a respective corner of an isosceles trapezoid, which may be a rectangular or square arrangement.

According to some examples, the second array processor is configured to provide the second array signal having a response substantially similar to a response of the first array signal in substantially all other directions not in the direction of the user location.

In some examples, the first response may be the result of a beam steered by the first array processor toward the user location and/or the second response may be the result of a null steered by the second array processor toward the user location.

In certain examples, the user location is a first user location, and the double-talk detector also includes a third array processor configured to combine the plurality of signals to provide a third array signal having a third response in a direction of a second user location, the processor being further configured to make a second comparison of an energy content of the third array signal to an energy content of at least one of the first array signal or the second array signal, and to selectively indicate double-talk based at least in part upon the second comparison. In some examples, the first user location is a driver's location of a vehicle and the second user location is a passenger's location of the vehicle.

According to some examples, the double-talk detector also includes a third array processor configured to combine the plurality of signals to provide a third array signal having a third response in a direction of a second user location, and a fourth array processor configured to combine the plurality of signals to provide a fourth array signal having a fourth response in the direction of the second user location, the fourth response being different from the third response, and the processor may be configured to make a second comparison of an energy content of the third array signal to an energy content of the fourth array signal, and to selectively indicate double-talk based at least in part upon the second comparison.

In certain examples, the processor is configured to compare the energy content of the first array signal to the energy content of the second array signal by comparing a threshold to one of a ratio and a difference, the ratio or the difference being between one of an energy, amplitude, or envelope of the first array signal and one of an energy, amplitude, or envelope of the second array signal.

In some examples, the first array processor is further configured to provide the first array signal as a plurality of frequency bins. The processor may be configured to derive the energy content of the first array signal as a weighted summation of a plurality of energy content values, each of the plurality of energy content values representing an energy content of one of the plurality of frequency bins.

According to another aspect, a method of detecting speech activity of a user is provided. The method includes receiving a plurality of signals derived from a plurality of non-linearly arranged microphones, array processing the plurality of signals to generate a primary signal having a first acoustic response in the direction of a user location, receiving a reference signal derived from one or more microphones, the reference signal having a second acoustic response to acoustic signals originating from the user location, the second acoustic response being lower than the first acoustic response, comparing an energy of the primary signal to an energy of the reference signal, and selectively indicating double-talk based on the comparison.

In some examples, array processing the plurality of signals to generate a primary signal having the first acoustic response includes steering a beam toward the user location, the steered beam causing an enhanced acoustic response in the direction of the user location.

Certain examples also include deriving the reference signal from the plurality of signals by array processing the plurality of signals to steer a null toward the user location.

Some examples also include deriving the reference signal from the plurality of signals by array processing the plurality of signals to have the second acoustic response substantially reduced in a direction of the user location relative to the first acoustic response of the primary signal, and to have a response substantially similar to a response of the primary signal in all other directions.

In some examples comparing an energy of the primary signal to an energy of the reference signal includes comparing a threshold to one of a ratio and a difference, the ratio or the difference being between one of an energy, amplitude, or envelope of the primary signal and a respective energy, amplitude, or envelope of the reference signal.

Certain examples include array processing the plurality of signals to generate a second primary signal that includes a third acoustic response in the direction of a second user location, comparing an energy, amplitude, or envelope of the second primary signal to an energy, amplitude, or envelope of the reference signal, and indicating double-talk based on the comparison.

Some examples include separating each of the plurality of signals into one or more frequency bins, and wherein array processing the plurality of signals includes operating on the plurality of signals within one or more frequency bins to generate at least one frequency bin portion of the primary signal.

Some examples include deriving the energy of the primary signal and deriving the energy of the reference signal, each derived energy being a weighted summation of a plurality of energy content values, each of the plurality of energy content values representing an energy content of one of a plurality of frequency bins of the respective signal. In certain examples, the weighted summation may omit one or more of the plurality of energy content values representing a frequency bin for which the primary signal and the reference signal exhibit differing acoustic responses in the absence of user speech activity.

In some examples, comparing an energy of the primary signal to an energy of the reference signal includes a first order recursive power estimation configured to provide a weighted average of signal energy over time, characterized by a smoothing factor.

In certain examples, array processing the plurality of signals to generate the primary signal includes using a super-directive near-field beamformer. The super-directive near-field beamformer may be a minimum variance distortionless response beamformer in some examples.

According to another aspect, a double-talk detector is provided that includes a plurality of microphones configured to provide a plurality of signals, a first array processor configured to combine the plurality of signals to provide a first array signal having a first response in a direction of a driver's location in a vehicle, a second array processor configured to combine the plurality of signals to provide a second array signal having a second response in the direction of the driver's location, the second response being different from the first response, a third array processor configured to combine the plurality of signals to provide a third array signal having a third response in a direction of a passenger's location in the vehicle, a fourth array processor configured to combine the plurality of signals to provide a fourth array signal having a fourth response in the direction of the passenger's location, the fourth response being different from the third response, and a processor configured to make a first comparison of an energy content of the first array signal to an energy content of the second array signal, to make a second comparison of an energy content of the third array signal to an energy content of the fourth array signal, and to selectively indicate double-talk based upon at least one of the first comparison and the second comparison.

In some examples, the plurality of microphones are arranged in a non-linear physical arrangement. In certain examples, the plurality of microphones includes four microphones mounted in the vehicle and arranged physically at a respective corner of an isosceles trapezoid, rectangle, or square.

In certain examples, the second array processor is further configured to provide the second array signal having a response substantially similar to a response of the first array signal in substantially all other directions not in the direction of the driver's location.

According to some examples, the first response is a result of a beam steered by the first array processor toward the driver's location and/or the second response is a result of a null steered by the second array processor toward the driver's location.

According to another aspect, a double-talk detector is provided that includes a plurality of microphones configured to provide a plurality of signals, a first array processor configured to combine the plurality of signals to provide a first array signal having a first response in a direction of a driver's location in a vehicle, a second array processor configured to combine the plurality of signals to provide a second array signal having a second response in the direction of a passenger's location, a third array processor configured to combine the plurality of signals to provide a third array signal having a generalized response to acoustic energy in the vehicle, and a processor configured to make a first comparison of an energy content of the first array signal to an energy content of the third array signal and to make a second comparison of an energy content of the second array signal to an energy content of the third array signal, and to selectively indicate double-talk based upon at least one of the first comparison and the second comparison.

In some examples, the plurality of microphones are arranged in a non-linear physical arrangement. In certain examples, the plurality of microphones includes four microphones mounted in the vehicle and arranged physically at a respective corner of an isosceles trapezoid, rectangle, or square.

In certain examples, the third array processor is further configured to provide the third array signal having a response substantially similar to a response of the first array signal in substantially all other directions not in the direction of the driver's location.

According to some examples, the first response is a result of a beam steered by the first array processor toward the driver's location.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Figure 1:
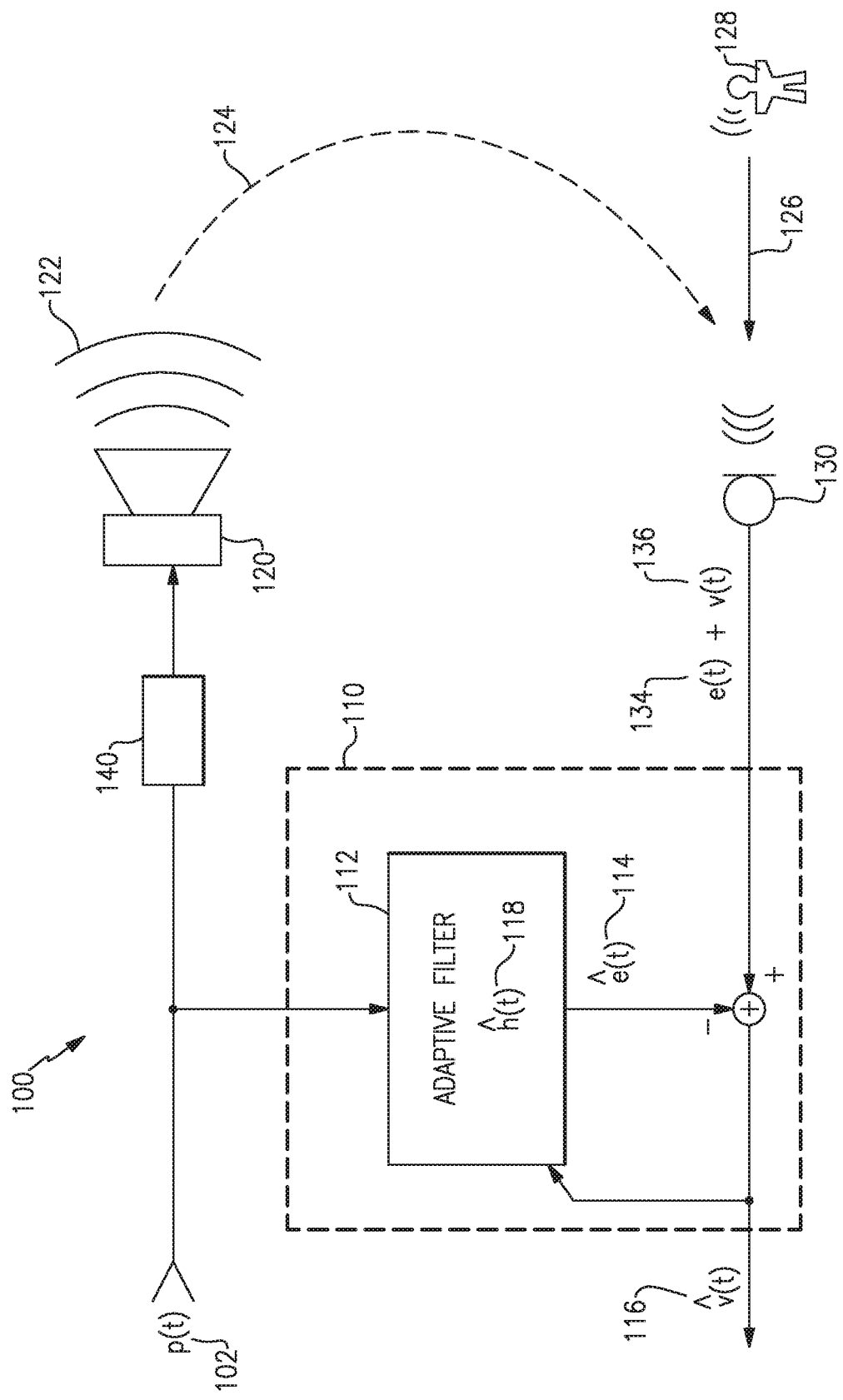
FIG. 1 is a schematic diagram of an example audio system including echo cancelation.

Aspects of the present disclosure are directed to audio systems and methods that provide double-talk detection (DTD), such as voice activity detection (VAD) of a local user, that may be advantageous as a control input to echo reduction and/or residual echo suppression systems, for example, as in such systems that use adaptive algorithms and/or filters. Such a control input may be useful for other application or components that may benefit from voice activity detection, such as to cue an audio recording, cue a voice recognition system, activate a virtual personal assistant (VPA), trigger automatic gain control (AGC), sidetone gain adjustment, or other voice operated switch (VOX) applications.

Audio systems, especially automotive audio systems, may produce acoustic signals in an environment, e.g., a vehicle compartment, for the benefit of people in the environment. The acoustic signals may be for entertainment, information, communication, and navigation, for example. Such audio systems may also accept acoustic input from the occupants, e.g., one or more people may verbally speak and their voices may be picked up by the audio system, e.g., via one or more microphones. These verbal signals may be associated with telephone conversations, verbal commands to a navigation system or a virtual personal assistant, and the like.

When the audio system renders an acoustic signal, e.g., via a loudspeaker, the microphone(s) may also pick up the rendered acoustic signal in addition to the user's voice. For example, the user may be having a phone conversation and listening to the radio at the same time, and the microphone will pick up both the user's voice and the radio program. A portion of the microphone signal may therefore be due to the audio system's own acoustic production, and that portion of the microphone signal is deemed an echo signal. In such cases, an acoustic echo canceler may be used to reduce or remove the echo signal portion from the microphone signal. Such echo cancelation systems, as well as noise reduction and residual post-filtering, may use adaptive techniques (e.g., adaptive filters, adaptive algorithms) that work to track echo (and/or noise) signals while the user is not speaking. Such adaptive techniques may need to pause or halt adaptation when the user speaks, and accordingly a voice activity detector, or double-talk detector, may be beneficial to provide an indication of whether a local user is actively speaking.

Aspects and examples disclosed herein detect user speech activity to provide double-talk detection functionality for audio systems, especially in an environment that may have additional audio rendering acoustic sources and may have numerous users. Double-talk detection systems and methods as disclosed herein may provide spatial discrimination, e.g., detecting the direction from which one or more acoustic sources originates, to determine whether a user is speaking. For example, a user in a driver's seat or a user in a passenger seat. Systems and methods disclosed herein may detect acoustic signal energy coming from one or more of such positions in comparison to acoustic signal energy from other locations to determine whether a user is speaking.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Regarding the use of symbols herein, a capital letter, e.g., H, generally represents a term, signal, or quantity in the frequency or spectral domain, and a lowercase letter, e.g., h, generally represents a term, signal, or quantity in the time domain. Relation between time and frequency domain is generally well known, and is described at least under the realm of Fourier mathematics or analysis, and is accordingly not presented herein. In many cases, a particular symbol may represent a set of values, such as an array or matrix, of weights or factors, for example, and is generally presented in bold, e.g., w. Many values may be complex values, such as filter or array coefficients, to accommodate amplitude and phase adjustments, for example.

Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g., f, and discrete frequency indexes (such as frequency bins), e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

Further regarding audio signal processing, various treatments and processing of signals may be carried out across a number of frequency blocks or bins. Any number of frequency bins, across any suitable range of frequencies, may be selected to accommodate varying system requirements. For instance, in certain examples a signal power estimation may be calculated for each of multiple frequency bins, such as 32, 64, or 256 frequency bins, or more. In various examples, the signals may be analyzed across any suitable number of frequency bins, or a system adjustable or selectable number of frequency bins.

Further, the frequency range may be limited to those frequencies deemed important for particular applications, such as the processing of human speech, which generally only requires a narrower frequency range than that which humans are capable of hearing. Accordingly, for example, an audio program content signal may include content across a spectrum of 20 Hz to 20,000 Hz, while a microphone, echo canceler, spectral analysis, post filter, and other components intended to operate upon user speech signals (depending upon application and operational characteristics), may be configured to operate on a more limited frequency range, such as up to 4 kHz, 5 kHz, 8 kHz, 11 kHz, or 12 kHz, for example. In other examples, suitable frequency ranges may include 60 Hz to 8,000 Hz, or 100 Hz to 4,000 Hz, or any other suitable range, depending upon the application. A selection of number of frequency bins may be related to a selection of frequency range in some examples, depending upon operating requirements. A broader frequency range may require a higher number of frequency bins to achieve a particular spectral resolution, for example.

FIG. 1 illustrates an example audio system 100 that includes an echo canceler 110, one or more acoustic drivers 120, and one or more microphones 130. The audio system 100 receives a program content signal 102, p(t), that is converted into an acoustic program signal 122 by the one or more acoustic drivers 120. The acoustic drivers 120 may have further processing component(s) 140 associated with them, such as may provide array processing, amplification, equalization, mixing, etc. Additionally, the program content signal 102 may include multiple tracks, such as a stereo left and right pair, or multiple program content signals to be mixed or processed in various ways. The program content signal 102 may be an analog or digital signal and may be provided as a compressed and/or packetized stream, and additional information may be received as part of such a stream, such as instructions, commands, or parameters from another system for control and/or configuration of the processing component(s) 140, the echo canceler 110, or other components.

The block diagrams illustrated in the figures, such as the example audio system 100 of FIG. 1, are schematic representations and not necessarily illustrative of individual hardware elements. For instance, in some examples, each of the echo canceler(s) 110, the processing component(s) 140, and other components and/or any portions or combinations of these, may be implemented in one set of circuitry, such as a digital signal processor, a controller, or other logic circuitry, and may include instructions for the circuitry to perform the functions described herein.

A microphone, such as the microphone 130, may receive each of an acoustic echo signal 124, an acoustic voice signal 126 from a user 128, and other acoustic signals such as background noise and/or road noise. The microphone 130 converts acoustic signals into, e.g., electrical signals, and provides them to the echo canceler 110. Specifically, when a user 128 is speaking, the microphone 130 provides a voice signal 136, v(t), and an echo signal 134, e(t), as part of a combined signal to the echo canceler 110. The echo canceler 110 functions to attempt to remove the echo signal 134 from the combined signal to provide an estimated voice signal 116, $\hat{v}$(t). In some examples, the echo canceler 110 may work to remove the echo signal 134 by processing the program content signal 102 through a filter 112 to produce an estimated echo signal 114, ê(t), which is subtracted from the signal provided by the microphone 130.

For example, the acoustic program signal 122 causes the echo signal 134, and the filter 112 attempts to replicate the transfer function from the program content signal 102 as it is converted into the echo signal 134. In some examples, the filter 112 may include an adaptive algorithm that updates the filter 112, at intervals, to replicate the transfer function and improve the estimated echo signal 114. Such adaptive algorithms perform most optimally when a microphone signal includes only the echo signal 134, e.g., when the user 128 is not speaking. Accordingly, such adaptive algorithms may stop updating the filter 112 when the user 128 is speaking, at least temporarily. Accordingly, a detector to detect when the user 128 is speaking may be beneficially applied to improve performance of the echo canceler 110.

In some examples, the filter 112 may apply a set of filter coefficients to the program content signal 102 to produce the estimated echo signal 114, ê(t). The adaptive algorithm may use any of various techniques to determine the filter coefficients and to update, or change, the filter coefficients to improve performance of the filter 112. In some examples, the adaptive algorithm may operate on a background filter, separate from the filter 112, to seek out a set of filter coefficients that performs better than an active set of coefficients being used in the filter 112. When a better set of coefficients is identified, they may be copied to the filter 112 in active operation.

Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms. The filter 112, as adapted by the adaptive algorithm, converges to apply an estimated transfer function 118, ĥ(t), which is representative of the overall response of the processing 140, the acoustic driver(s) 120, the acoustic environment, and the microphone(s) 130, to the program content signal 102. As discussed above, the transfer function is a representation of how the program content signal 102 is transformed into the echo signal 134.

While the echo canceler 110 works to remove the echo signal 134 from the combined microphone signal, rapid changes and/or non-linearities in the echo path may prevent the echo canceler 110 from providing a precise estimated echo signal 114 to perfectly match the echo signal 134, leaving a residual echo at the output. In some examples, the residual echo may be reduced or suppressed by the addition of a post filter to spectrally enhance the estimated voice signal 116 (e.g., to spectrally suppress residual echo).

Figure 2:
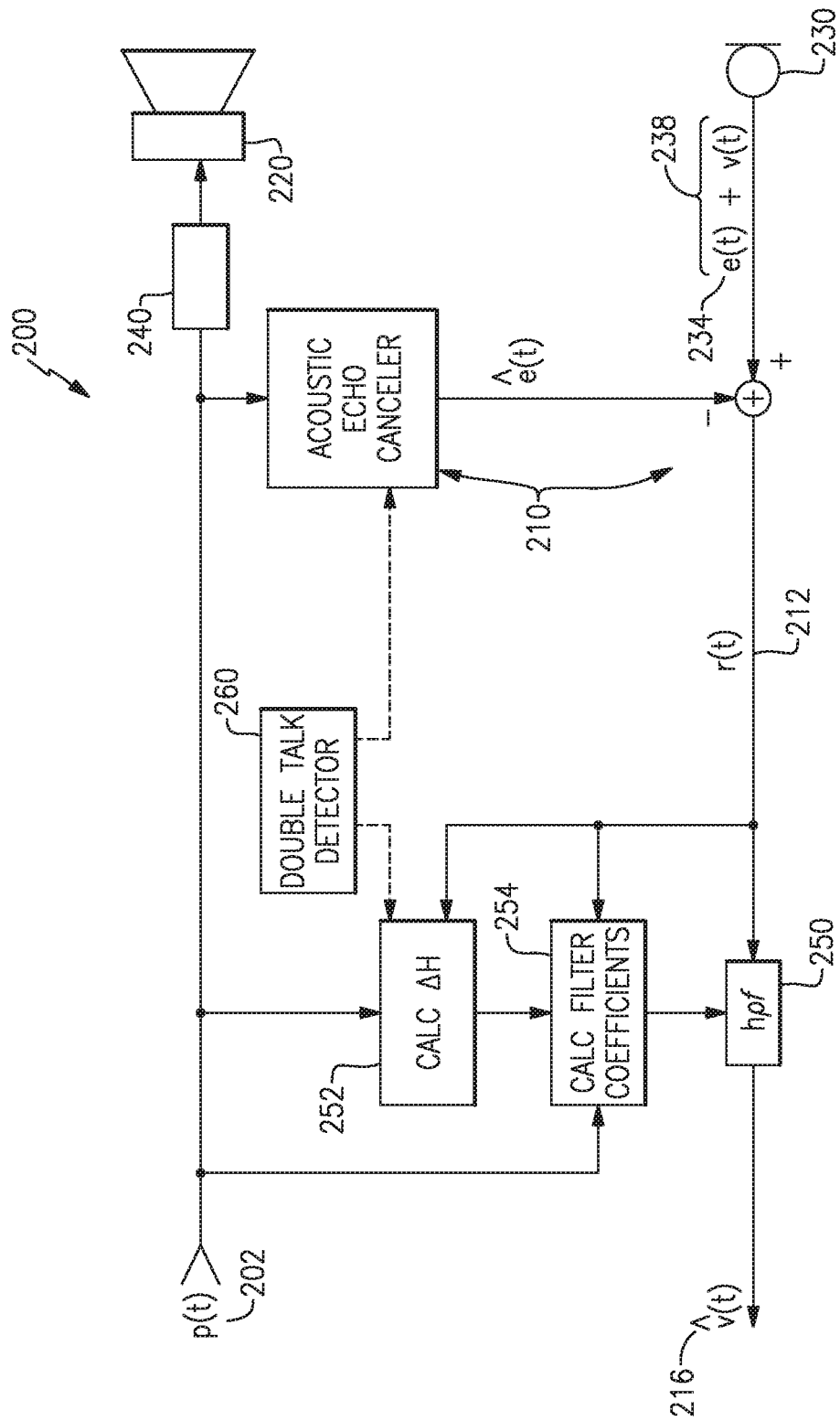
FIG. 2 is a schematic diagram of an example audio system including residual echo suppression and a double-talk detector.

FIG. 2 illustrates a further example audio system 200 that includes an echo canceler 210, one or more acoustic drivers 220, one or more microphones 230, audio signal processing 240, a post filter 250, and a double-talk detector 260. Similar to the audio system 100 of FIG. 1, the audio system 200 receives a program content signal 202 and converts it into an acoustic program signal by the one or more acoustic drivers 220, and the echo canceler 210 operates to remove or reduce an echo signal 234 from a combined signal 238 provided by the microphone 230. The resulting signal 212 may include a residual echo component, as discussed above. The post filter 250 operates to suppress the residual echo component with spectral filtering to produce an improved estimated voice signal 216.

The post filter 250 is supported by a spectral analysis block 252 that characterizes the spectral power and/or spectral content of the resulting signal 212 relative to the program content signal 202. The spectral analysis block 252 calculates a spectral mismatch, ΔH, (also termed echo mismatch in some examples) between the actual echo path and the acoustic echo canceler 210. A coefficient calculation block 254 uses the spectral mismatch to calculate filter coefficients for the post filter 250.

The echo path is, for example, the entire path taken by the program content signal 202 from where it is provided to the echo canceler 210, through the processing 240, the acoustic driver 220, the acoustic environment, and through the microphone 230. The actual echo path may further include processing by the microphone 230 or other supporting components, such as array processing, for example. The calculation of spectral mismatches by the spectral analysis block 252 may occur regularly, and rapidly, at intervals, but may perform optimally when a user is not speaking, e.g., when the signal from the microphone(s) 230 does not include a voice signal component. Accordingly, a double-talk detector such as the double-talk detector 260 may advantageously supply an indication whether a user is speaking, and the spectral analysis block 252 may halt or pause the calculation of new spectral mismatches. As also shown in FIG. 2, the double-talk detector 260 also provides the indication of double-talk to the echo canceler 210, which may halt or pause adaptive algorithm updates, as discussed above, in response to the indication of double-talk.

Figure 3:
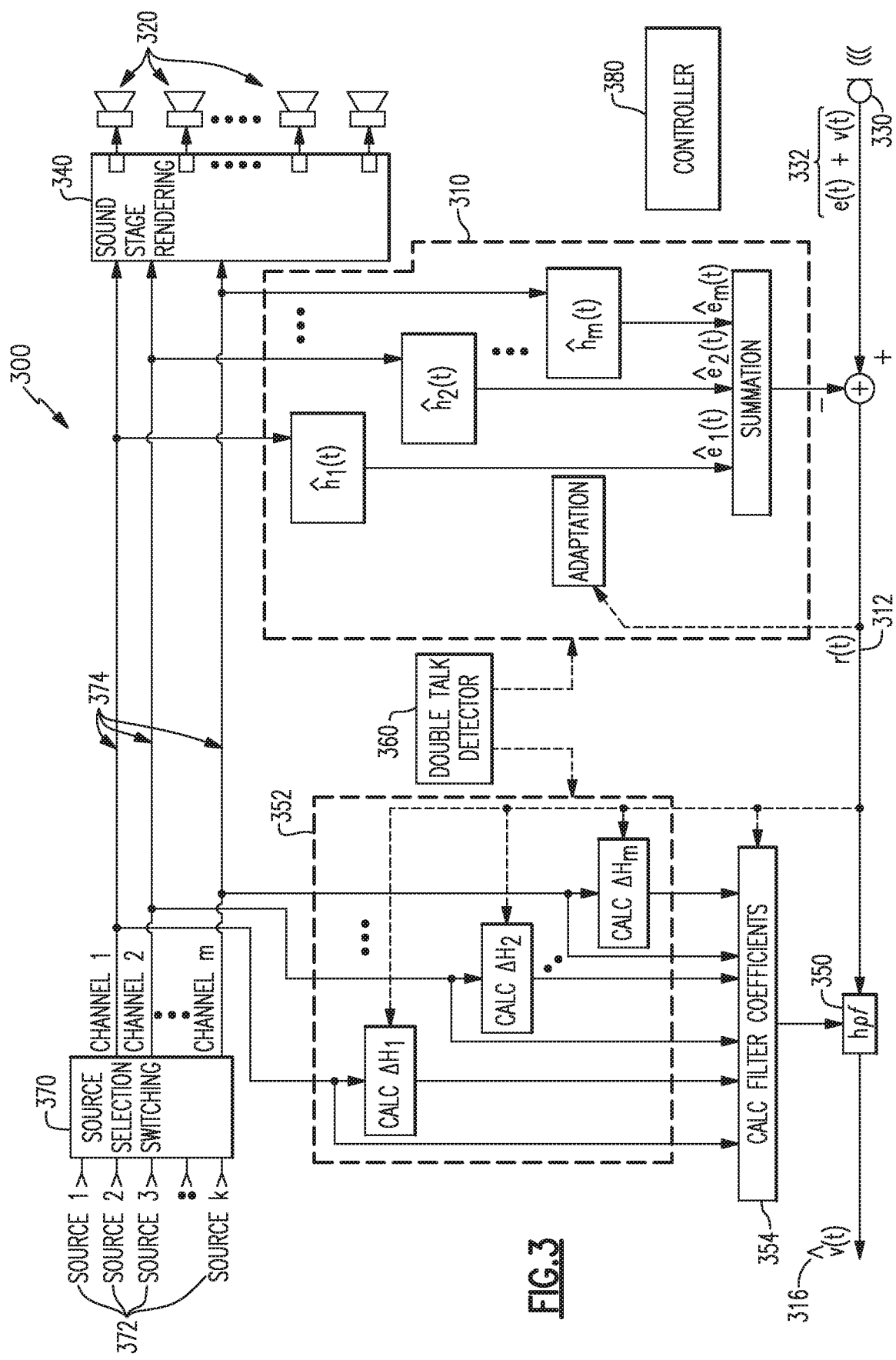
FIG. 3 is a schematic diagram of an example audio system including multi-channel echo cancelation and residual echo suppression and a double-talk detector.

FIG. 3 illustrates an example multi-channel audio system 300 that includes source selection switching 370 to allow selection from among multiple sources 372 to provide one or more program content signals to individual content channels 374 for rendering as acoustic signals. The audio system 300 also includes a sound stage processor 340 to control a number of acoustic transducers 320, at least one microphone input and/or microphone 330 to pick up acoustic signals in the environment, including user voices and audio system echoes. The audio system 300 also includes an echo cancelation subsystem 310 and a post filter 350 to suppress residual echo and to provide an estimated voice signal 316. The post filter 350 is also supported by a spectral analysis subsystem 352 and a coefficient calculation block 354. The audio system 300 also includes a double talk detector 360, and a controller 380 to manage one or more components of the source selection switching 370, the sound stage processor 340, the echo cancelation subsystem 310, the post filter 350 and supporting components, and/or the double talk detector 360.

In some examples, the echo cancelation subsystem 310, spectral analysis subsystem 352, and the coefficient calculation block 354 may operate on signals or signal channels after processing by the sound stage processor 340, rather than prior to sound stage processing as shown in the figures. For example, the echo cancelation subsystem 310, spectral analysis subsystem 352, and the coefficient calculation block 354 may operate on signals provided directly to the acoustic transducers 320, before or after amplification. In other examples, there may be various signal processing before, after, or both before and after the provision of such signals to the echo cancelation subsystem 310, spectral analysis subsystem 352, and the coefficient calculation block 354.

In some examples, the microphone 330 may be an array of microphones, having array processing to provide regions of enhanced response, such as in various spatial directions toward sources of desired acoustic signals and/or away from noise sources, which may include beam steering, and may additionally or alternately provide regions of reduced response, e.g., in other spatial directions, such as by steering nulls toward noise sources. In such examples, the controller 380 may further control such array processing components, or such array processing components may be alternately controlled and/or may be pre-configured for various operating characteristics.

According to various aspects and examples, various microphone signals will be processed in various ways to detect whether an occupant of a vehicle is actively speaking. Detection of an occupant speaking will sometimes be referred to as voice activity detection (VAD), but for the purpose of indicating double-talk the terminology may typically be double-talk detection (DTD). As used herein, the terms "voice," "speech," "talk," and variations thereof are used interchangeably and without regard for whether such speech involves use of the vocal folds.

Examples disclosed herein to detect double-talk (e.g., occupant speech activity) may operate or rely on various principles of the environment, acoustics, vocal characteristics, and unique aspects of use, e.g., placement of a plurality of microphones relative to the expected location of an occupant (e.g., driver's seat, passenger's seat). For example, in a vehicular environment, a user's voice generally originates at a location near a headrest of a particular seat, and will arrive at the various microphones with differing delays and phase. These differences may be utilized by array processing such that a combination of the microphone signals has enhanced or reduced response for acoustic signals coming from particular locations. Background noise, echo signals from rendered audio program content, and vocalizations from other occupants at different locations cause acoustic energy received at any of the microphones to be at a particular level, and the acoustic energy level will increase when the particular occupant's voice activity is added to these other acoustic signals. The difference in acoustic energy level may be enhanced by examples discussed herein by using the spatial, or directional, attributes of array processing. Various spectral characteristics can also play a beneficial role in detecting a user's voice activity, such as by weighting particular sub-bands and/or frequency bins within sub-bands, when comparing acoustic signal energies and/or applying thresholds to a detection decision.

Various examples of a double-talk detector in accord with those disclosed herein are spatial detectors that employ a microphone array to detect the presence or absence of speech propagating from a particular seat in a vehicle. According to some examples, to detect speech from a particular seat in a vehicle, two beamforming configurations are implemented from the microphone array, at least one of which has either an enhanced or suppressed response for acoustic signals coming from the particular seat, to allow detection of a spatial difference in acoustic signal energy, e.g., from the particular seat versus the surroundings more generally.

Figure 4:
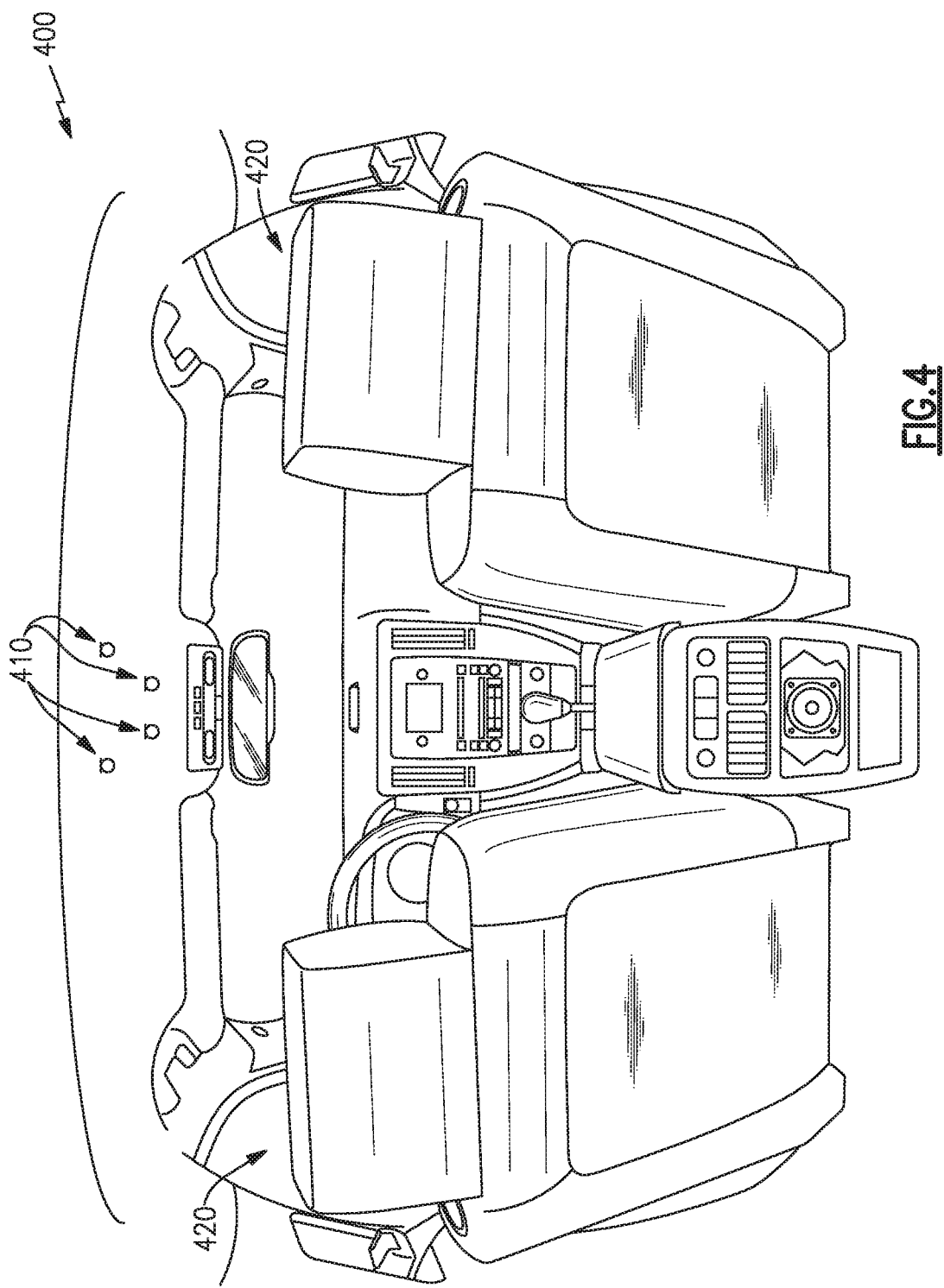
FIG. 4 is a perspective view of a vehicular environment in which the example audio systems of FIGS. 1-3 may operate.

For example, and as illustrated in FIG. 4, a vehicle passenger compartment 400 is shown, which could be an automobile, a plane, a train, etc., and includes one example of a physical arrangement of a number of microphones 410, positioned to be capable of detecting acoustic signals from one or more occupant locations 420. The occupant locations 420 may include, for example, a driver's seat, a passenger's seat, rear seats (not shown) or other occupant positions, depending upon the type of vehicle and desired operational characteristics. In the example shown in FIG. 4, the microphones 410 are physically arranged in an isosceles trapezoidal pattern, which for purposes herein includes rectangular or square patterns, or are physically arranged in a parallelogram or rhombus pattern, or one of any other trapezoidal pattern or arcuate patterns. In some examples, a set of four microphones 410 are approximately 5 to 9 cm apart in one dimension and approximately 14 to 20 cm apart in an orthogonal dimension of a rectangular arrangement. In at least one example, a set of four microphones 410 are spaced approximately 6.5 cm apart in one dimension and approximately 16.5 cm apart in the other dimension. Some examples may include microphones physically arranged in an arcuate, linear, or other pattern, and may or may not all lie within a single plane. In some examples, more or fewer than four microphones 410 may be included.

Examples of spatial double-talk detector systems and methods discussed herein are capable of supporting numerous physical arrangements of the microphones 410, and in particular non-linear physical arrangements of the microphones 410. In some examples, one or more of the microphones 410 may also be one or more of the microphone(s) 130, 230, 330 of FIGS. 1-3 used to provide signals to be processed by an echo canceler, noise canceler, and/or post filter to provide a voice estimate signal. In other examples, the microphones 410 may be a separate set of microphones to provide signals to a double-talk detector, e.g., without regard to the ultimate voice signal to be provided to one or more other systems, such as communications equipment, navigation equipment, virtual personal assistant(s), and the like.

While microphones are illustrated in the various figures, the visual element illustrated in the figures may, in some examples, represent an acoustic port wherein acoustic signals enter to ultimately reach a microphone, which may be internal and not physically visible from the exterior. In examples, one or more of the microphones may be immediately adjacent to the interior of an acoustic port, or may be removed from an acoustic port by a distance, and may include an acoustic waveguide between an acoustic port and an associated microphone.

Figure 5:
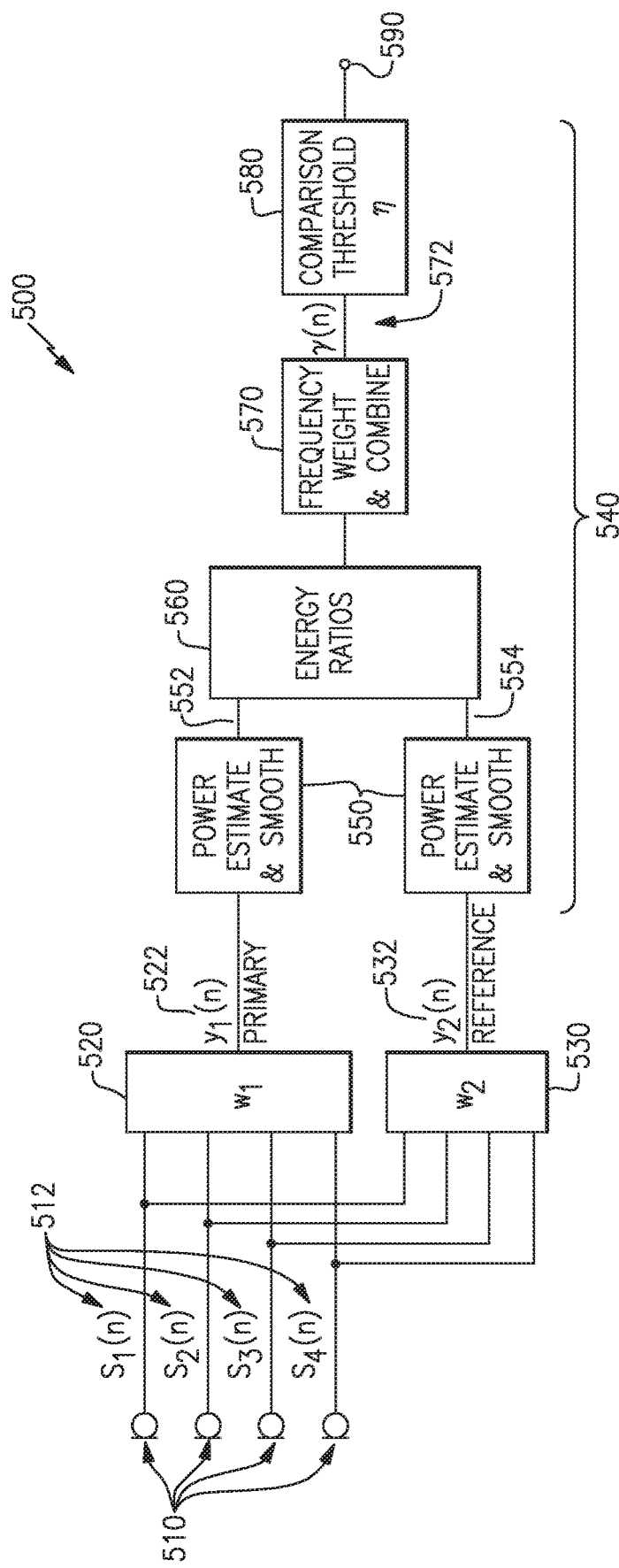
FIG. 5 is a schematic diagram of an example double-talk detector.

FIG. 5 illustrates a double-talk detector 500 including four microphones 510, each providing a microphone signal 512, $s_i(n)$, to a primary array processor 520 and a reference array processor 530. Each of $s_i(n)$, (i=1, . . . , 4), represents a time-domain signal at the ith microphone 510. In this example, four microphones are used but more or fewer may be included in other examples. Each of the primary array processor 520 and the reference array processor 530 apply a set of weights, $w_1$ and $w_2$, respectively, for a first and second beamforming configuration. As used herein, beamforming may include a general spatial response, such as a response to a region or "cloud" of potential acoustic source locations, that may be associated with a range of three dimensional positions from which a user, e.g., a vehicle occupant, may speak. Beamforming can be applied in time-domain or in frequency-domain. $y_1(n)$ represents a time-domain primary signal 522, which is the output of the primary array processor 520, and $y_2(n)$ represents a time-domain reference signal 532, which is the output of the reference array processor 530.

The frequency components of $y_1(n)$ and $y_2(n)$, at frequency band f, is obtained as follows:

$$Y_1(f)=w_1^H(f)s(f) \quad (1)$$

$$Y_2(f)=w_2^H(f)s(f) \quad (2)$$

Where f=1, . . . , F, with F being the number of frequency bins. $s(f)=[S_1(f), \ldots, S_4(f)]^T$ represents the frequency components of the input signals, and the weight vectors $w_i(f)$ represent the beamforming weights for each of the array processors 520, 530, respectively, at frequency bin, f. $w_1^H(f)$ represents the Hermitian of $w_i(f)$, which is the complex conjugate transpose of $w_i(f)$.

Various spatial responses may be formed using beamforming techniques to design or select the weight vectors. In particular examples, the weight vectors are designed using minimum variance distortionless response (MVDR) techniques. In some examples, the primary array processor 520 implements a beamformer designed using MVDR and the reference array processor 530 implements a noise sensing combination having a spatial response to substantially match that of the primary array processor 520, except in a direction toward a particular occupant location. In the direction of the particular occupant location, the reference array processor 530 may have a reduced response as compared to the primary array processor 520, in some examples. In some examples, each of the two array processors may be designed using theoretical equations for a beamformer, a steering vector, and noise field, and/or may include empirical modification to fine-tune and/or optimize their respective responses.

In some examples, a method of designing a double-talk detector 500 may include MVDR techniques to design the respective spatial response provided by each of the primary array processor 520 and the reference array processor 530. Also in some examples, audio recordings made from within a vehicle may be used to measure practical transfer functions, noise coherence matrices, or other design inputs. Actual driver and passenger speech (with varying orientations) may be used to estimate the transfer functions. Additionally, recordings of actual noise and interference signals may be used to measure and/or compute a noise coherence matrix.

With continued reference to FIG. 5, the primary signal 522 is the output of the primary array processor 520, and the reference signal 532 is the output of the reference array processor 530. The primary signal 522 and the reference signal 532 are compared by a comparison block 540, which may perform one or more of various processes, such as estimate the energy (or power) in each signal (in total or on a per frequency bin basis), smooth or otherwise time average the signal energies, take ratios of the signal energies, apply various weighting to the signal energies (or ratios in some examples) in particular frequency bins, apply one or more thresholds, or other combinations of more or fewer of these processes, in any suitable order, to determine whether an occupant is speaking at the particular location. With the comparison block 540 operating on the primary signal 522 and the reference signal 532, to determine whether an occupant is speaking, it is desirable to maximize the difference in signal energies between the primary signal 522 and the reference signal 532, when the occupant is speaking. It may be advantageous to both maximize the difference in signal energies between the primary signal 522 and the reference signal 532 when the occupant is speaking, and also to maximize the difference between the signals when the occupant is speaking relative to the difference between the signals when the occupant is not speaking. Accordingly, it may be advantageous to minimize the difference between the primary signal 522 and the reference signal 532 when the occupant is not speaking, such that the primary signal 522 and the reference signal 532 have approximately similar signal energies when the occupant is not speaking. In various examples, it may be sufficient that the primary signal 522 and the reference signal 532 maintain a substantially constant energy ratio in response to varying acoustic levels (e.g., noise and interference), when the occupant is not speaking.

In at least one example, the reference array processor 530 may be designed to provide a substantially similar response pattern (e.g., in space, spatially) to that of the primary array processor 520, but for a range of directions toward the occupant location. Accordingly, the energy in the reference signal 532 may be approximately the same as the energy in the primary signal 522 when the occupant at the particular location is not speaking.

From actual recordings, beamforming weight vectors may be analyzed and revised to increase a difference in signal energies at the outputs of the two array processors 520, 530 for speaking occupants of various sizes, genders, positions, etc., relative to or in view of various vehicle and road noises (engine, tires, environmental control) and reproduced audio content such as navigation prompts, driver alert messages, entertainment (music, sports, or other broadcast transmissions), and other acoustic sources, and to minimize the difference in signal energies when the occupant is not speaking. For example, the double-talk detector 500 may perform optimally when the signal energies to be compared are substantially the same when the particular occupant is not speaking and have a maximized difference (e.g., substantially different) when the particular occupant is speaking.

As mentioned above, reproduction of audio in a vehicle may be made from recordings and the response of one or more of the microphones 410, 510 may be measured to characterize a transfer function from a particular occupant location to the microphone. For a plurality of microphones, such as the microphones 410, 510, each of the microphones may be measured, in some examples. In other examples, one of the microphones may be a reference microphone whose response to occupant speech is measured, and the various responses (e.g., transfer functions) of each additional microphone (in response to the occupant's speech) may be determined by measured transfer functions between the reference microphone and each of the additional microphones. The delay and attenuation of the set of microphones in the frequency domain, in response to an occupant speaking at a particular location, may be represented as a response matrix, d(f), also known as a "steering vector" in some instances, that is a set of complex (amplitude and phase) response vectors (components of the vectors being the response at particular frequencies, or frequency bins), one response vector for each of the microphones.

From the response matrix, d(f), a weight vector at frequency f, to yield an appropriate MVDR beamformer by the primary array processor 520, may be computed as follows:

$$w(f) = \frac{\Gamma_{VV}^{-1}(f)d(f)}{d^H(f)\Gamma_{VV}^{-1}(f)d(f)} \qquad (3)$$

where d(f) is the representation of the delays and attenuations of the set of microphones in the frequency-domain, which depends on the physical geometry of the microphone array and the location of the particular occupant position, e.g., the location of the source of the desired signal. In some examples, d(f) may be determined in part from measured transfer functions between the reference microphone in the array and all microphones, as discussed above, when only an occupant speech signal is present, and in some examples may include measured response to occupant speech from a "cloud" or region of occupant positions and/or orientations. $d(f)^H$ represents the Hermitian of d(f), which is the complex conjugate transpose of d(f).$r_{vv}(f)$ is a noise coherence matrix at the microphones. This matrix may be computed in some examples by considering only signals deemed as noise and computing correlations between the different microphones.

Equation (3) above yields a set of beamforming weights for the primary array processor 520, in some examples. This configuration of the primary array processor 520 is designed to pass the occupant's speech signal originating from the particular occupant location (the response matrix is the response from the particular location), with minimal distortion. The reference array processor 530, in some examples, is intended to minimize, attenuate, or reject the occupant's speech signal from the particular occupant location. In certain examples, constraints are added to ensure that both beamforming configurations (e.g., produced by the primary and reference array processors 520, 530) treat other signals in the vehicle (music, ventilation noise, navigation announcements, etc.) in a substantially similar fashion. Accordingly, in some examples, the response pattern produced by the reference array processor 530 is substantially the same, in at least some frequency bins to be compared, as the primary array processor 520, for directions that are not oriented toward the particular occupant location of interest. As a result, detection of speech is accomplished by comparing the energy levels at the outputs of the two array processors 520, 530, potentially with accordant smoothing, frequency weighting, and threshold application, or any combination of these or other processing, in various examples.

As discussed above, various processing may be applied in certain examples, such as power measurement (e.g., power estimation) and time-averaging, or smoothing, by power estimation blocks 550. In some examples, one or more smoothing parameters may be adjusted to maximize the difference between a smoothed primary power signal 552 and a smoothed reference power signal 554 when the occupant is speaking. In certain examples, and as discussed above, the power estimates may be processed on a per frequency bin basis. Accordingly, each of the primary signal 522 and the reference signal 532 may be separated into frequency bins by the power estimation blocks 550, or such separation into frequency bins may occur elsewhere.

With continued reference to FIG. 5, and in some examples, a power estimate at each frequency may be produced by the power estimation blocks 550, as follows:

$$P_1(f,n) = (1-\alpha)|Y_1(f,n)|^2 + \alpha P_1(f,n-1) \tag{4}$$

$$P_2(f,n) = (1-\alpha)|Y_2(f,n)|^2 + \alpha P_2(f,n-1) \tag{5}$$

where $P_1(f, n)$ is an output power estimate at frequency f from the primary array processor 520 at a current frame n, and $P_1(f, n-1)$ is the estimate from the previous frame, and $Y_1(f, n)$ is the frequency component of the output at the current frame. $\alpha$ is a smoothing factor in the range [0,1]. In some examples, the smoothing factor, $\alpha$, prevents abrupt changes in the outputs (e.g., the smoothed primary power signal 552 and the smoothed reference power signal 554). A small value of a puts more weight on the current frame and less weight on the previous ones. In some examples, differing frequency bins may have differing values for the smoothing factor, $\alpha$. In some examples the smoothing factor, $\alpha$, may be selectable by the system or adjustable based upon different conditions in the vehicle, such as whether a fan impeller (e.g., from an environmental control system) is in operation, for example, or based on performance of the system according to varying criteria. In such cases, the smoothing factor, $\alpha$, may also vary for differing frequency bins.

In some examples, after power estimates are computed, a ratio of the power estimates may be calculated at block 560, again on a per frequency bin basis, as follows:

$$\gamma(f, n) = 10 \log \frac{P_1(f, n)}{P_2(f, n)} \tag{6}$$

In some examples, the multiple ratios (one per frequency bin) may be combined into a single ratio, e.g., at block 570. In at least one example, the ratios at all frequency bins may be combined by block 570 using the arithmetic mean to provide a combined energy ratio 572, $\gamma(n)$, as follows:

$$\gamma(n) = \frac{1}{F}\sum_{f=1}^{F} \gamma(f, n) \tag{7}$$

In some examples, the ratios per frequency bin may be assigned different weights by block 570 to provide the combined energy ratio 572 (e.g., between the primary signal 522 and the reference signal 532), $\gamma(n)$. Such weighting factors may be adjusted, selected, or otherwise optimized to maximize the combined ratio (e.g., representing a difference between the primary signal 522 and the reference signal 532) when the occupant is speaking. For example, in some designs the outputs of the primary and reference array processors 520, 530 may be substantially different in a particular frequency bin even though no occupant is talking, e.g., due to the particular response patterns, noise coherence, etc. Such outputs might be determined by theoretical analysis, empirical testing, or other means, and accordingly a low weighting factor, or a weighting factor of zero, may be applied to this particular frequency bin, so as to reduce or remove the particular frequency bin's effect on the combined energy ratio 572.

In certain examples, the weighting of individual frequency bins may be selectable by the system or otherwise adjustable. For example, the weighting of one or more frequency bins may be selected or adjusted based upon a condition in the vehicle, such as whether a fan impeller (e.g., from an environmental control system) is in operation. In such a case, a portion of the spectrum in which the fan impeller generates the most noise may be reduced or excluded, e.g., by a low or zero weighting factor in one or more frequency bins, to reduce its contribution to the energy ratio, for example. In some examples, the weighting of one or more frequency bins may be selected or adjusted based on performance of the system according to varying criteria. In some examples, the weighting of one or more frequency bins may be selected or adjusted as a tuning parameter for a particular audio system, vehicle interior, or the like.

In some examples, the combined energy ratio 572 is compared to a predetermined threshold, e.g., by block 580, to detect the presence or absence of occupant speech activity in the current frame, as follows:

$$\gamma(n) \underset{H_0}{\overset{H_1}{\gtreqless}} \eta \tag{8}$$

where $\eta$ may be a predetermined or a tunable threshold, e.g., in decibels, $H_1$ denotes a frame determined to contain occupant speech, and $H_0$ denotes a frame determined to be without occupant speech. If the threshold is met, block 580 provides an indication at an output 590 that occupant speech is detected.

In some examples, beam-forming weight vectors of the various array processors, smoothing factors, frequency bin weighting, and other factors may be selected, tuned, or predetermined such that the combined energy ratio, $\gamma(n)$, between a primary signal and a reference signal remains substantially constant across various levels of noise (e.g., fans, wind, road noise) and other acoustic sources (e.g., audio system rendering, other occupants speaking) when the occupant is not speaking. As a result, when the combined energy ratio goes above the substantially constant value, the system may determine that the occupant is speaking. Accordingly, a fixed threshold, $\eta$, may be used for the detection of occupant voice activity in some examples In various examples as described herein, a reference array processor is designed to provide a substantially similar response pattern to that of a primary array processor, except in the direction of a particular occupant location, such that the energy in a reference signal is approximately the same as the energy in a primary signal when the occupant at the particular location is not speaking. Accordingly, the energy of the primary signal may be compared (e.g., as a combined ratio) to the energy of the reference signal without the need for compensation that may otherwise be necessary to correct for varying spatial treatment by one array processor relative to another.

Figure 8A:
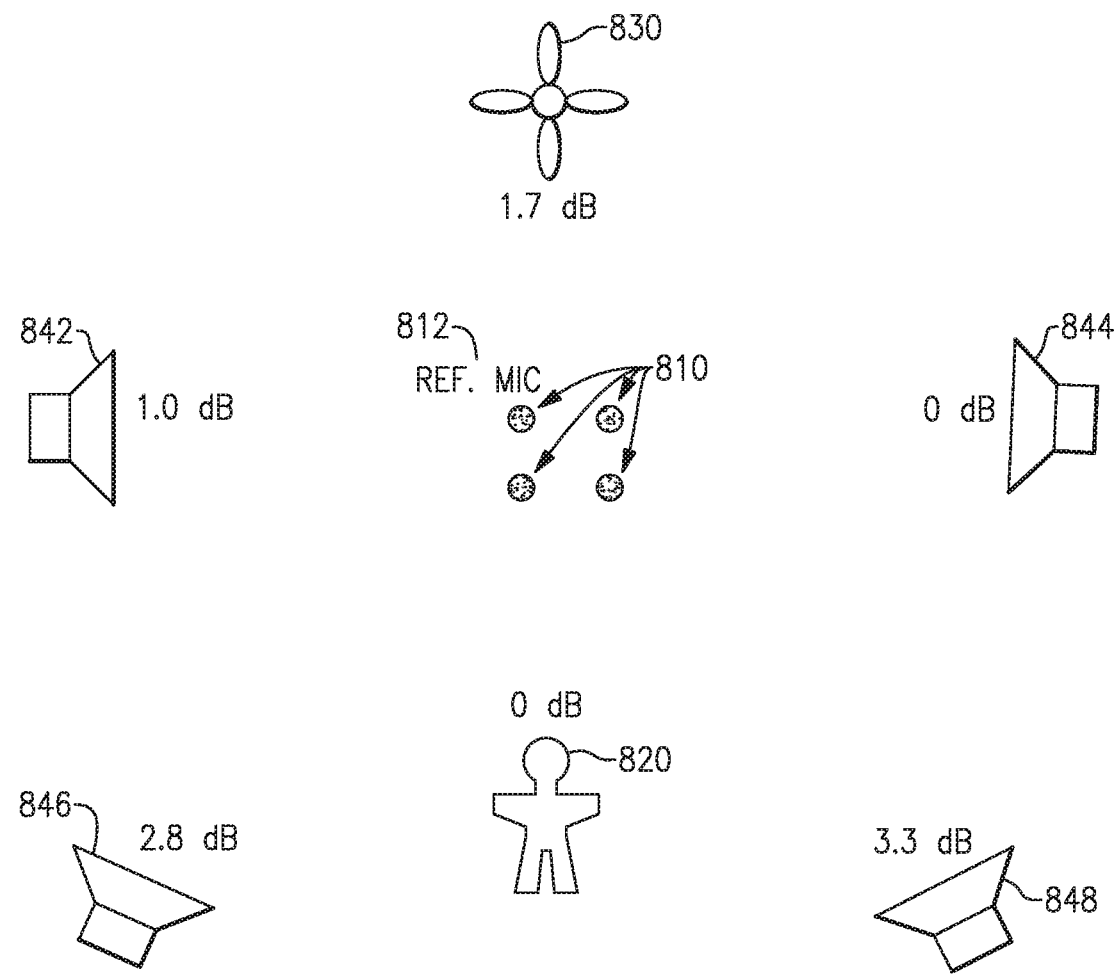
FIGS. 8A-8B are schematic diagrams of example acoustic attenuation from various locations in a vehicle.
Figure 8B:
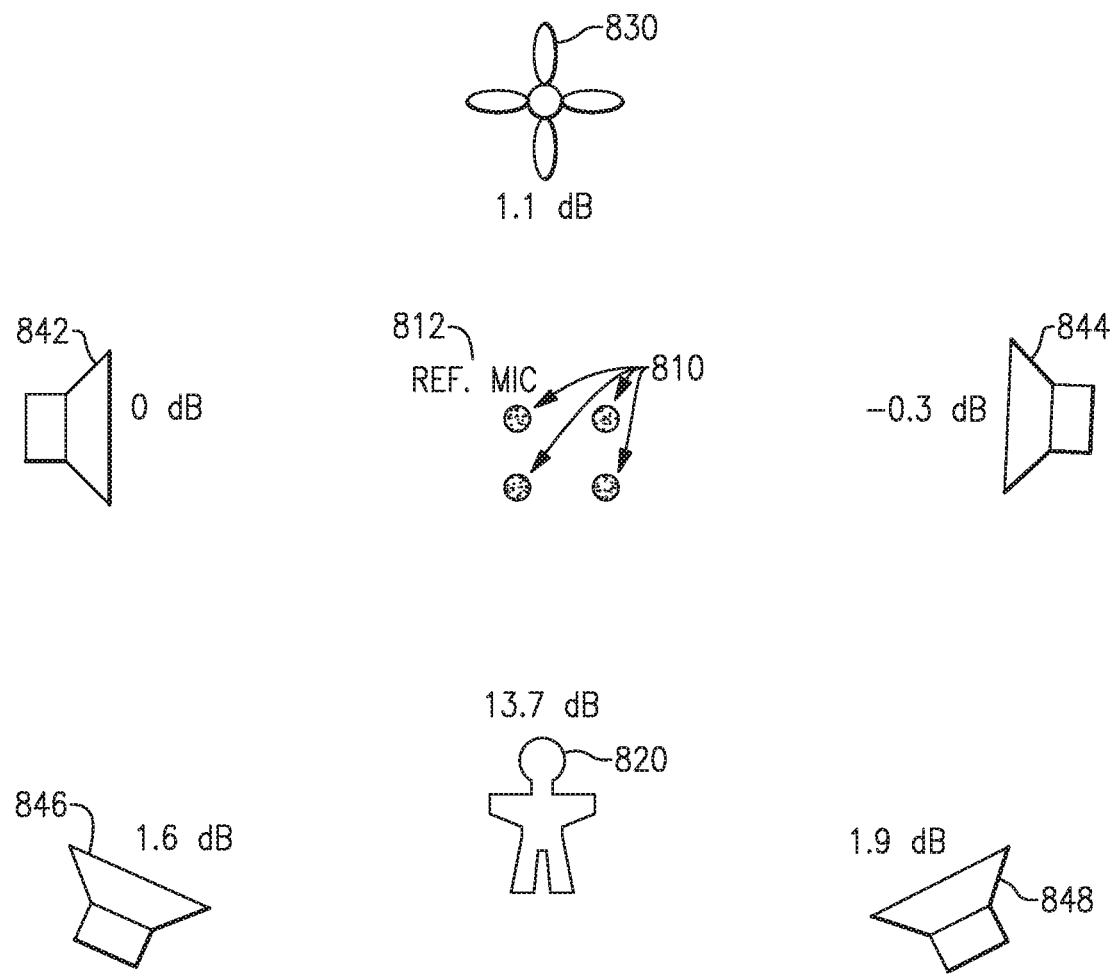

FIGS. 8A and 8B illustrate an example response from a primary array processor and a reference array processor, respectively, to various locations of acoustic sources. Each of FIGS. 8A and 8B include an example set of microphones 810 and show attenuation levels provided by an array processor acting on the signals from the microphones 810 from various directions, e.g., spatial responses, relative to a reference microphone 812 (which may be one of the set of microphones 810, in these examples). The various acoustic sources (and locations) illustrated include an occupant 820, a fan impeller 830 (e.g., part of an environmental control system in the vehicle), and a set of audio system loudspeakers 842, 844, 846, 848. Numerical values shown next to each acoustic source are attenuation levels, relative to a reference level, provided by a primary array processor in the case of FIG. 8A and a reference array processor in the case of FIG. 8B.

For example, the primary array processor's response, as illustrated in FIG. 8A, to acoustic signals coming from the occupant 820's location are attenuated by 0 dB. In some examples, the occupant 820's location may be chosen as the reference value, thus the 0 dB response. With the occupant 820's location as the reference, FIG. 8A shows that, in this example, the primary array processor provides an attenuation level of 1.7 dB for acoustic signals coming from the direction of the fan impeller 830. Similarly, the primary array processor provides an attenuation level of 1.0 dB, 0 dB, 2.8 dB, and 3.3 dB, respectively, for acoustic signals coming from the directions of the loudspeakers 842, 844, 846, and 848.

With reference to FIG. 8B, a reference array processor has a response to the various acoustic source directions all within 1.4 dB or less of that provided by the primary array processor, except for acoustic signals coming from the direction of the occupant 820's location. The acoustic response of the reference array processor for signals coming from the occupant 820's location is 13.7 dB lower than that for the primary array processor, e.g., the response in the direction of the occupant 820's location is attenuated by 13.7 dB by the reference array processor, relative to the primary array processor, in this example. In certain examples, the response from various acoustic directions other than the occupant 820's direction may all be within 3.0 dB of each other, e.g., between the primary and the reference array processor and therefore between the primary signal and the reference signal. In other examples, the responses from the various directions may all be within 4.5 dB of each other, or within 6.0 dB of each other, for directions other than the occupant 820's direction.

In the example illustrated by FIGS. 8A and 8B, the reference array processor (e.g., FIG. 8B) provides a significantly reduced response to acoustic signals coming from the direction of the occupant 820's location, relative to the primary array processor (e.g., FIG. 8A). In other examples, the primary array processor may provide a significantly enhanced response to acoustic signals coming from the direction of the occupant 820's location, relative to the reference array processor. In yet other examples, the primary array processor may provide a significantly enhanced response to acoustic signals coming from the direction of the occupant 820's location, and the reference array processor may provide a significantly reduced response to acoustic signals coming from the direction of the occupant 820's location, each relative to the responses provided to acoustic signals coming from other directions associated with the other acoustic sources shown.

In various examples, the processing of the comparison block 540 may include additional processing or may omit some processing, and may be performed in a different sequence or order than that discussed above. For example, calculational complexity of multiple energy ratios, e.g., one per frequency bin, by block 560, may be reduced in some examples by combining the frequency bin energies (with appropriate weighting, if desired) of each of the smoothed primary power signal 552 and the smoothed reference power signal 554, to form a combined primary power signal and a combined reference power signal, followed by taking a ratio of the combined power signals. Accordingly, this may allow a single ratio calculation (per frame) instead of a plurality of ratio calculations, one for each frequency bin.

Additionally, calculation of signal ratios may be further reduced in some examples, or replaced by a multiplication. For example, double-talk may be indicated when the weighted combined signal energy of the primary signal 522 is a certain threshold higher than the weighted combined signal energy of the reference signal 532, in a particular example. With reference to the double-talk detector 500 of FIG. 5, each of the primary and reference signals 522, 532 is power estimated and smoothed by blocks 550, then their ratios calculated or determined (on a per frequency bin basis) by block 560, then the ratios are weighted and combined by block 570, and the combined ratio is compared to the threshold by block 580. An alternate example that may reduce computational complexity may include smoothing the power estimate of each signal, then combining (with appropriate weighting) each signal's energy content across their frequency bins, yielding two scalar numbers, e.g., a primary energy value and a reference energy value, then multiplying the reference energy value by a threshold factor and making a direct comparison to the primary energy value. If the primary energy value is higher, the double-talk detector indicates that the occupant is speaking, else the double-talk detector indicates that the occupant is not speaking.

Figure 6:
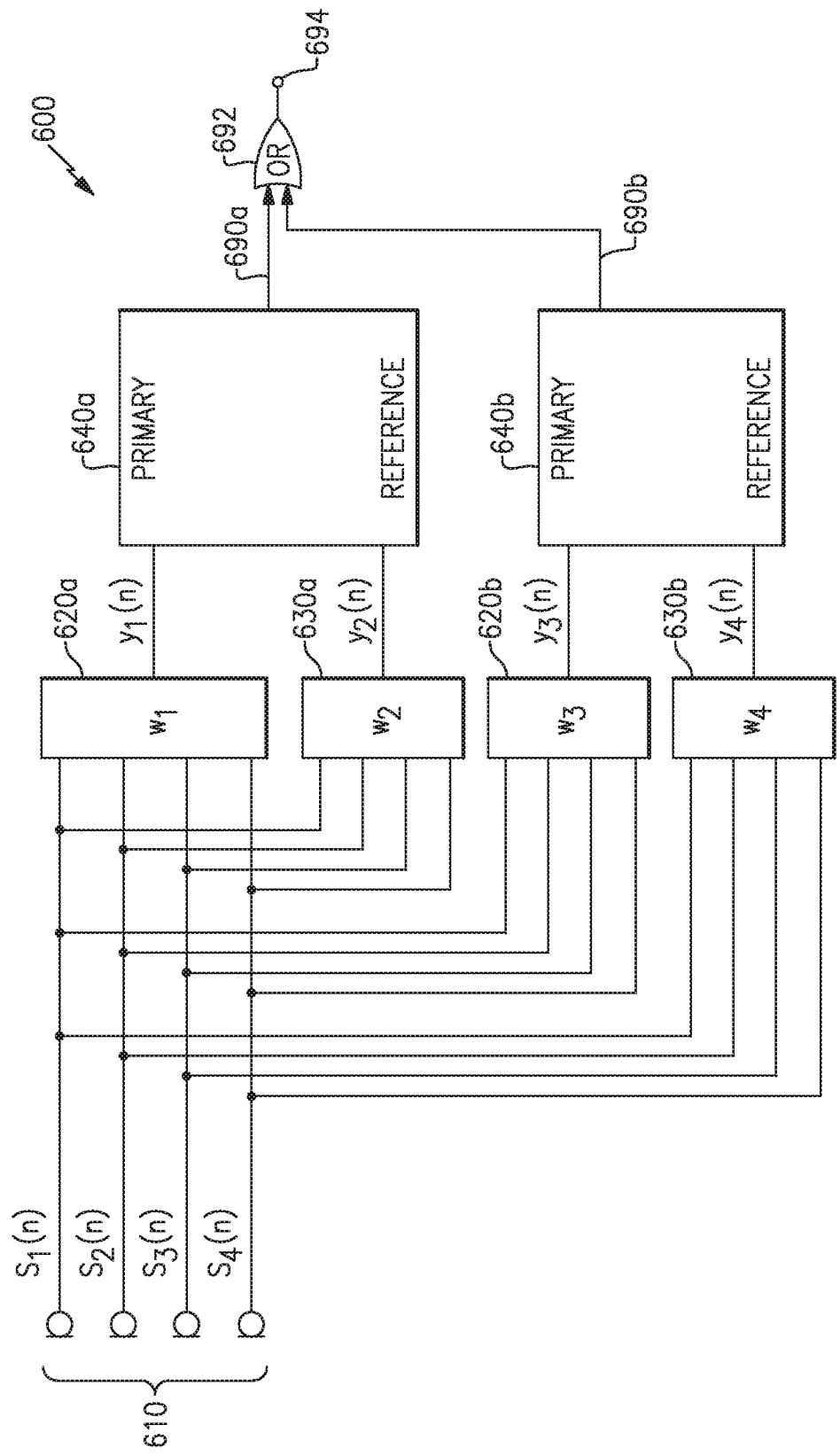
FIG. 6 is a schematic diagram of an example multi-position double-talk detector.

In some examples, multiple double-talk detectors, each for a particular seat, are included. The multiple double-talk detectors may be combined to form a single indication of voice activity from within the vehicle (e.g., among at least one of multiple seats). For example, FIG. 6 illustrates an example multi-position double-talk detector 600. Similar to the double-talk detector 500, the double-talk detector 600 includes a plurality of microphones 610 providing signals to a number of array processors. The double-talk detector 600 includes two primary array processors 620, one for each of two occupant positions. Each of the array processors 620 may include beamforming that includes enhanced response for acoustic signals coming from each of two respective occupant locations, e.g., a driver's seat and a passenger's seat. Additionally, the double-talk detector 600 includes two reference array processors 630, one for each of two occupant positions. Each of the array processors 630 may include beamforming that includes reduced response for acoustic signals coming from each of the two respective occupant locations, e.g., the driver's seat and the passenger's seat. For each occupant location, a primary and reference signal is compared by a respective comparison block 640, each of which may be identical to the comparison block 540 of FIG. 5 or any of various examples of a comparison block as discussed above, or others. Each comparison block 640 provides its own output 690 to indicate whether there is occupant speech activity at its respective occupant location, and if any comparison block 640 indicates speech activity, a logic 692 provides a combined indication at an output 694 to indicate that there is occupant speech activity. In some examples, the logical OR shown for the logic 692 may be replaced by other logic to combine the otherwise independent indications at the outputs 690.

In like manner, additional occupant locations may be included to detect occupant speech activity by additional array processors, to provide double-talk detection for any number of occupant locations as desired or necessitated by varying system parameters.

In some examples, a double-talk detector may detect occupant speech activity at multiple occupant locations by providing a single reference signal to be compared to each of multiple primary signals. For example, the reference array processors 630a, 630b in FIG. 6 may be replaced, in some examples, by a single reference array processor 630 whose output is provided as the reference signal for each of the comparison blocks 640a, 640b. In at least one example, a reference array processor 630 provides an omni-directional response pattern and serves to provide a reference signal for multiple primary signals, each of the primary signals including enhanced acoustic response to a respective occupant location to be detected. In alternate examples, a single primary array processor 620 may provide a single primary signal, such as an omni-directional signal, which is respectively compared (by a plurality of comparison blocks) to multiple reference signals, each of the reference signals including reduced acoustic response from a respective occupant location to be detected.

Figure 7:
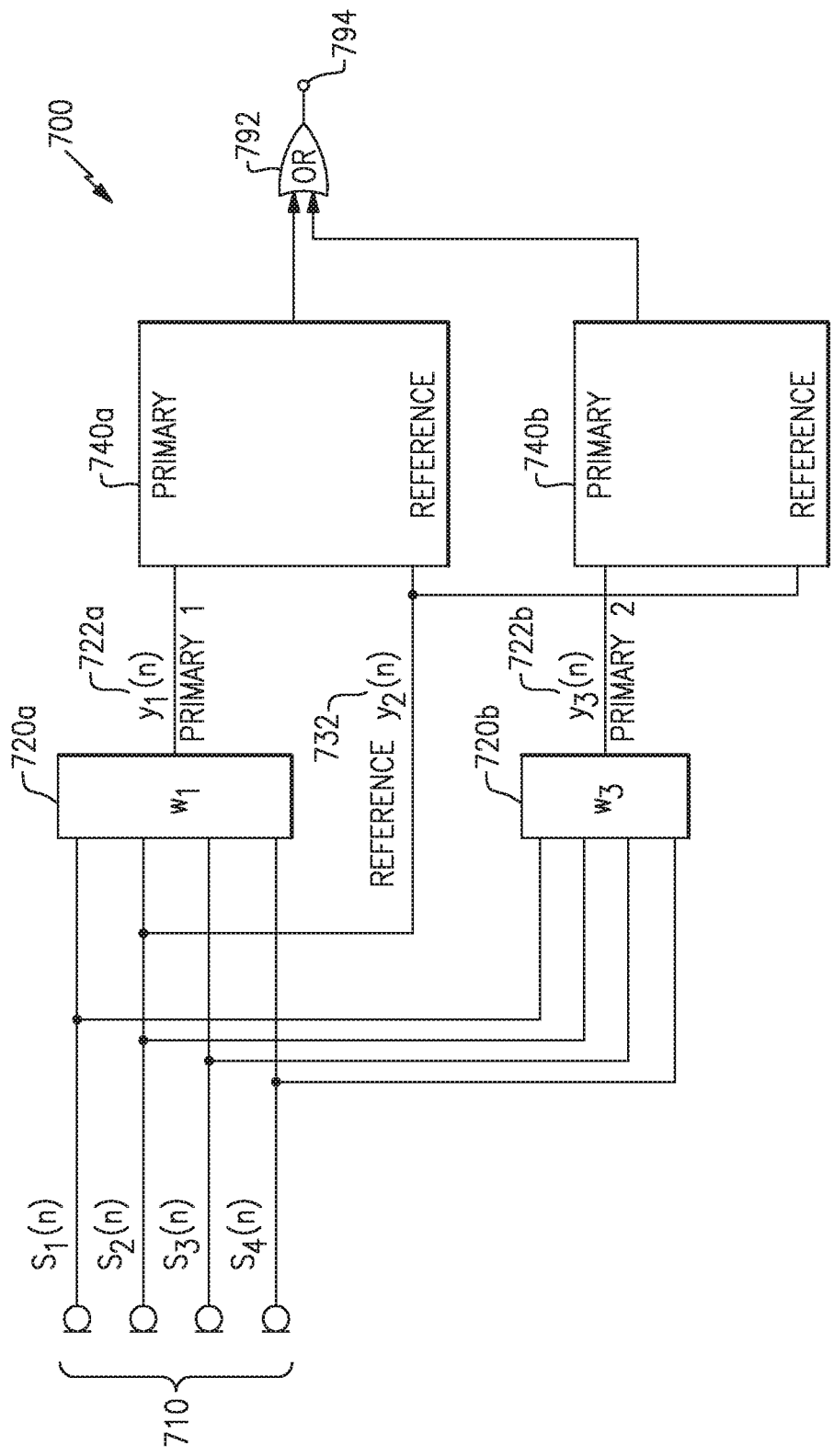
FIG. 7 is a schematic diagram of another example multi-position double-talk detector.

In some examples, an omni-directional signal may be provided by an array processor by rejecting all but one of the microphones. FIG. 7 illustrates a further example of a double-talk detector 700 that includes a plurality of microphones 710 combined by primary array processors 720a, 720b, to provide two primary signals 722a, 722b, that are compared to a single reference signal 732 by each of two comparison blocks 740a, 740b, respectively. The primary signal 722a is provided by the primary array processor 720a, and the primary signal 722b is provided by the primary array processor 720b. The reference signal 732 is provided by a single one of the plurality of microphones 710, e.g., the other microphones 710 are "rejected" or otherwise not combined with the selected microphone that provides the reference signal. In some examples, the single microphone may be an omnidirectional microphone and/or may be another microphone that isn't one of the plurality of microphones 710. In some examples, the reference signal 732 may be provided by an array processor that combines signals to provide a generalized or unity response.

One or more of the above described systems or methods, in various examples and combinations, may be used to detect that a vehicle occupant is actively speaking, e.g., to provide double-talk detection. Any of the systems or methods described may be implemented with varying levels of reliability based on, e.g., microphone quality, microphone placement, acoustic ports, vehicle structure and materials. Additionally, selection of various threshold values, smoothing algorithms, smoothing factor $\alpha$, weighting factors, windowing or frame size/length and overlap, number of frequency bins F, and the threshold $\eta$, may all be tuning parameters. These and other criteria may accommodate varying applications and operational parameters. Any example of the methods described above may be sufficient to adequately detect one or more occupant's voice activity for certain applications.

It should be understood that many, if not all, of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), microcontroller(s), and the like, or any combination of these, may be suitable, and may include analog or digital circuit components and/or other components with respect to any particular implementation. Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, driver, or loudspeaker, may be any of many types of transducers known in the art. For example, an acoustic structure coupled to a magnetic coil positioned in a magnetic field, to cause motion in response to electrical signals received by the coil, may be a suitable acoustic transducer. Additionally, a piezo-electric material may respond to electrical signals by expanding or contracting in one or more dimensions and may be a suitable acoustic transducer. In various examples, acoustic transducers may take other forms.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A double-talk detector, comprising:
   a plurality of microphones configured to provide a plurality of signals;
   a first array processor configured to combine the plurality of signals to provide a first array signal having a first response in a direction of a user location, the first array signal having a first energy level when an occupant at the user location is not speaking;
   a second array processor configured to combine the plurality of signals to provide a second array signal having a second response in the direction of the user location, the second response being different from the first response, and the second array signal having a second energy level when the occupant is not speaking, the second energy level being a substantially fixed ratio to the first energy level when the occupant is not speaking and having a higher ratio when the occupant is speaking; and
   a processor configured to make a comparison of an energy content of the first array signal to an energy content of the second array signal and to selectively indicate double-talk based on the comparison.

2. The double-talk detector of claim 1 wherein the plurality of microphones are arranged in a non-linear physical arrangement.

3. The double-talk detector of claim 2 wherein the plurality of microphones includes four microphones mounted in a vehicle and each of the four microphones are arranged physically at a respective corner of an isosceles trapezoid.

4. The double-talk detector of claim 1 wherein the second array processor is further configured to provide the second array signal having a response substantially similar to a response of the first array signal in substantially all other directions not in the direction of the user location.

5. The double-talk detector of claim 1 wherein the first response is a result of a beam steered by the first array processor toward the user location.

6. The double-talk detector of claim 1 wherein the second response is a result of a null steered by the second array processor toward the user location.

7. The double-talk detector of claim 1 wherein the user location is a first user location, and further comprising a third array processor configured to combine the plurality of signals to provide a third array signal having a third response in a direction of a second user location, the processor being further configured to make a second comparison of an energy content of the third array signal to an energy content of at least one of the first array signal or the second array signal, and to selectively indicate double-talk based at least in part upon the second comparison.

8. The double-talk detector of claim 7 wherein the first user location is a driver's location of a vehicle and the second user location is a passenger's location of the vehicle.

9. The double-talk detector of claim 1 further comprising:
a third array processor configured to combine the plurality of signals to provide a third array signal having a third response in a direction of a second user location; and
a fourth array processor configured to combine the plurality of signals to provide a fourth array signal having a fourth response in the direction of the second user location, the fourth response being different from the third response,
the processor being further configured to make a second comparison of an energy content of the third array signal to an energy content of the fourth array signal, and to selectively indicate double-talk based at least in part upon the second comparison.

10. The double-talk detector of claim 1 wherein the processor is configured to compare the energy content of the first array signal to the energy content of the second array signal by comparing a threshold to one of a ratio and a difference, the ratio or the difference being between one of an energy, amplitude, or envelope of the first array signal and one of an energy, amplitude, or envelope of the second array signal.

11. The double-talk detector of claim 1 wherein the first array processor is further configured to provide the first array signal as a plurality of frequency bins.

12. The double-talk detector of claim 11 wherein the processor is further configured to derive the energy content of the first array signal as a weighted summation of a plurality of energy content values, each of the plurality of energy content values representing an energy content of one of the plurality of frequency bins.

13. A method of detecting speech activity of a user, the method comprising:
receiving a plurality of signals derived from a plurality of non-linearly arranged microphones;
array processing the plurality of signals to generate a primary signal having a first acoustic response in the direction of a user location;
receiving a reference signal derived from one or more microphones, the reference signal having a second acoustic response to acoustic signals originating from the user location, the second acoustic response being lower than the first acoustic response;
comparing an energy of the primary signal to an energy of the reference signal; and
selectively indicating double-talk based on the comparison.

14. The method of claim 13 further comprising deriving the reference signal from the plurality of signals by array processing the plurality of signals to steer a null toward the user location.

15. The method of claim 13 further comprising deriving the reference signal from the plurality of signals by array processing the plurality of signals to have the second acoustic response substantially reduced in a direction of the user location, relative to the first acoustic response of the primary signal, and to have a response substantially similar to a response of the primary signal in all other directions.

16. The method of claim 13 wherein comparing an energy of the primary signal to an energy of the reference signal includes comparing a threshold to one of a ratio and a difference, the ratio or the difference being between one of an energy, amplitude, or envelope of the primary signal and a respective energy, amplitude, or envelope of the reference signal.

17. The method of claim 13 further comprising array processing the plurality of signals to generate a second primary signal that includes a third acoustic response in the direction of a second user location, comparing an energy, amplitude, or envelope of the second primary signal to an energy, amplitude, or envelope of the reference signal, and indicating double-talk based on the comparison.

18. The method of claim 13 further comprising separating each of the plurality of signals into one or more frequency bins, and wherein array processing the plurality of signals includes operating on the plurality of signals within one or more frequency bins to generate at least one frequency bin portion of the primary signal.

19. The method of claim 13 further comprising deriving the energy of the primary signal and deriving the energy of the reference signal, each derived energy being a weighted summation of a plurality of energy content values, each of the plurality of energy content values representing an energy content of one of a plurality of frequency bins of the respective signal.

20. The method of claim 19 wherein the weighted summation omits one or more of the plurality of energy content values representing a frequency bin for which the primary signal and the reference signal exhibit differing acoustic responses in the absence of user speech activity.

21. The method of claim 13 wherein comparing an energy of the primary signal to an energy of the reference signal includes a first order recursive power estimation configured to provide a weighted average of signal energy over time, characterized by a smoothing factor.

22. The method of claim 13 wherein array processing the plurality of signals to generate the primary signal includes using a super-directive near-field beamformer.

23. The method of claim 22 wherein the super-directive near-field beamformer is a minimum variance distortionless response beamformer.

24. A double-talk detector, comprising:
an input configured to receive a plurality of microphone signals;
a first array processor configured to combine the plurality of microphone signals to provide a first array signal having a first response in a direction of a first location in a vehicle;
a second array processor configured to combine the plurality of microphone signals to provide a second array signal having a second response in the direction of a second location in the vehicle; and
a processor configured to combine one or more of the plurality of microphone signals to provide a reference signal, to make a first comparison of an energy content of the first array signal to an energy content of the reference signal, to make a second comparison of an energy content of the second array signal to an energy content of the reference signal, and to selectively indicate double-talk based upon at least one of the first comparison and the second comparison.

25. The double-talk detector of claim 24 wherein the first and second array processors are configured to receive the plurality of microphone signals from microphones arranged in a non-linear physical arrangement.

26. The double-talk detector of claim 25 wherein the first and second array processors are configured to receive the plurality of microphone signals from four microphones mounted in the vehicle arranged physically at respective corners of an isosceles trapezoid.

27. The double-talk detector of claim 24 wherein the processor is further configured to provide the reference signal having a response substantially similar to a response of the first array signal when a user is not speaking.

* * * * *